United States Patent
Ng et al.

(10) Patent No.: US 6,841,296 B2
(45) Date of Patent: Jan. 11, 2005

(54) PRISMATIC BATTERY WITH MAXIMIZED AND BALANCED CURRENT TRANSMISSION BETWEEN ELECTRODES AND TERMINALS

(76) Inventors: Andrew Sung-On Ng, 2/F Gold Peak Building, 30 Kwai Wing Road., Kwai Chung (HK); Peter Ling, 4/F Gold Peak Building, 30 Kwai Wing Road., Hong Kong (HK)

(*) Notice: Subject to any disclaimer, the term of this patent is extended or adjusted under 35 U.S.C. 154(b) by 0 days.

(21) Appl. No.: 10/045,304

(22) Filed: Jan. 15, 2002

(65) Prior Publication Data

US 2002/0081489 A1 Jun. 27, 2002

(51) Int. Cl.[7] .......................... H01M 2/26; H01M 4/02; H01M 6/10
(52) U.S. Cl. ...................... 429/161; 429/160; 429/211; 429/94
(58) Field of Search .................... 429/161, 121, 429/123, 128, 94, 7, 211, 160, 178

(56) References Cited

U.S. PATENT DOCUMENTS 6,040,086 A * 3/2000 Yoshida et al. ............. 429/211
2002/0142211 A1 * 10/2002 Nakanishi et al. ........... 429/94
2003/0129494 A1 * 7/2003 Kaneda et al. ........... 429/231.1
2003/0134203 A1 * 7/2003 Fan et al. .................... 429/245

FOREIGN PATENT DOCUMENTS

JP          2000-299100        * 10/2000    ............ H01M/2/26

* cited by examiner

Primary Examiner—Raymond Alejandro
(74) Attorney, Agent, or Firm—Donn K. Harms

(57) ABSTRACT

An improved battery cell having electrodes formed of active material adhered to a conductive substrate with active surface areas communicating along an entire edge portion with conductors thereby minimizing resistance and allowing for communication of electrical current to and from the battery at a high rate with an even discharge from the electrodes. The plurality of electrodes is then stacked or wound to a desired configuration with a porous separator separating each adjacent electrode from the other. Communication along the entire edge of the formed electrodes on the conductive substrate with a conductive edge portion of the substrate, provide for maximum current flow in and out of the battery as well as well as reducing thermal concerns in high current applications. Elongated electrical conductors best made from copper are attached to substantially the entire length of the positive and negative edge portions.

26 Claims, 11 Drawing Sheets

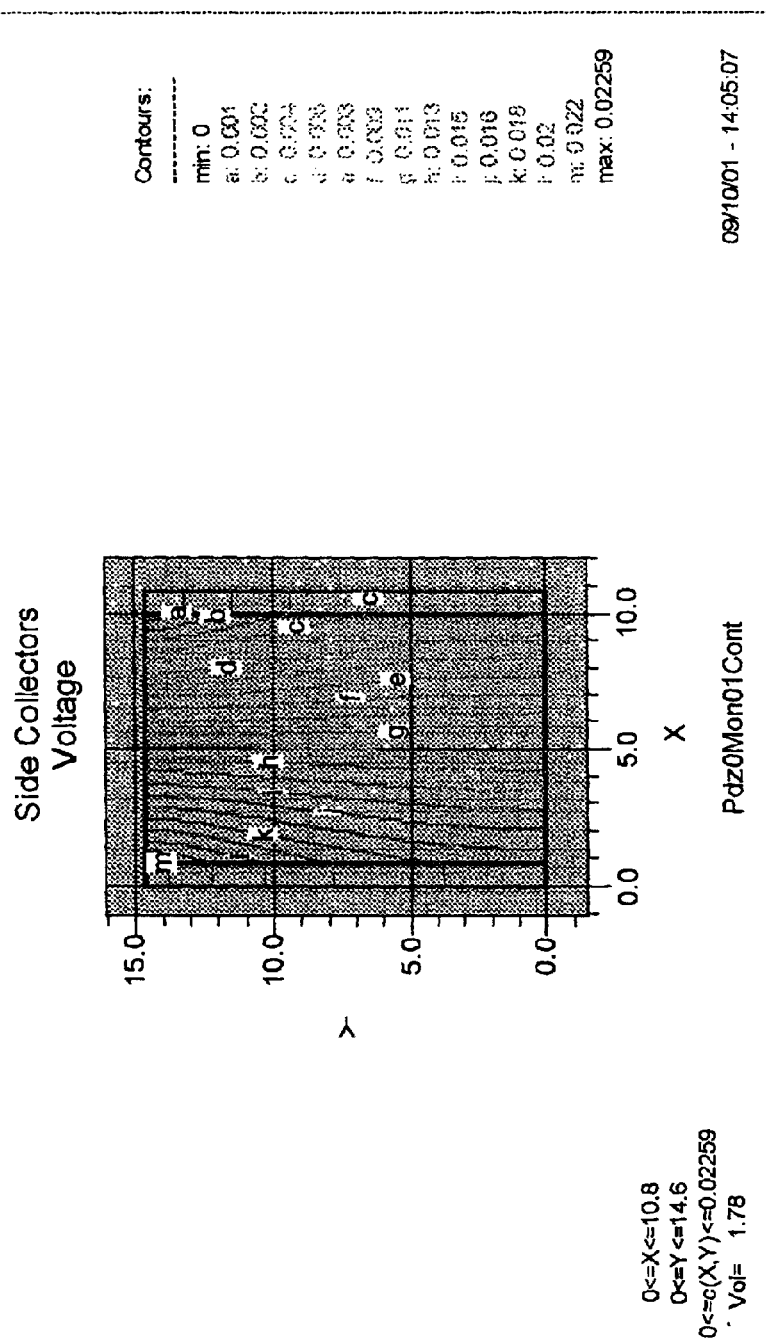

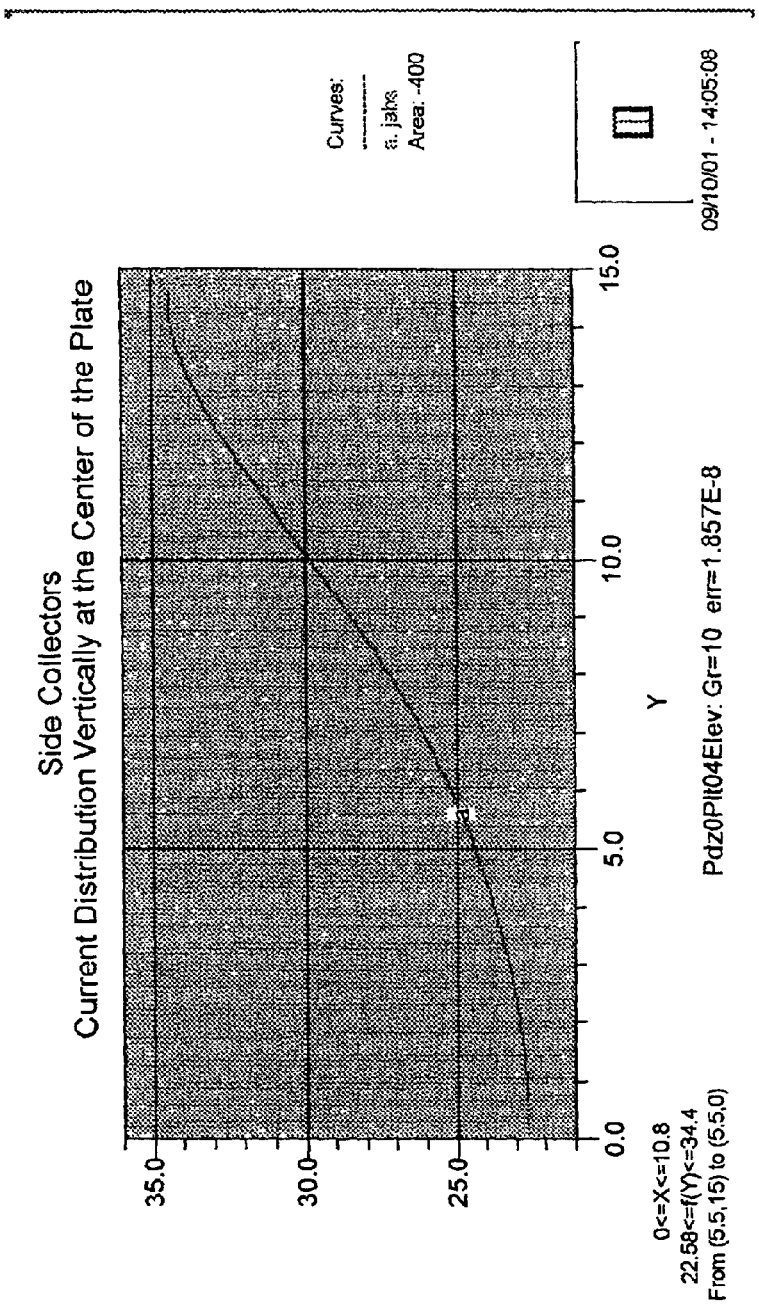

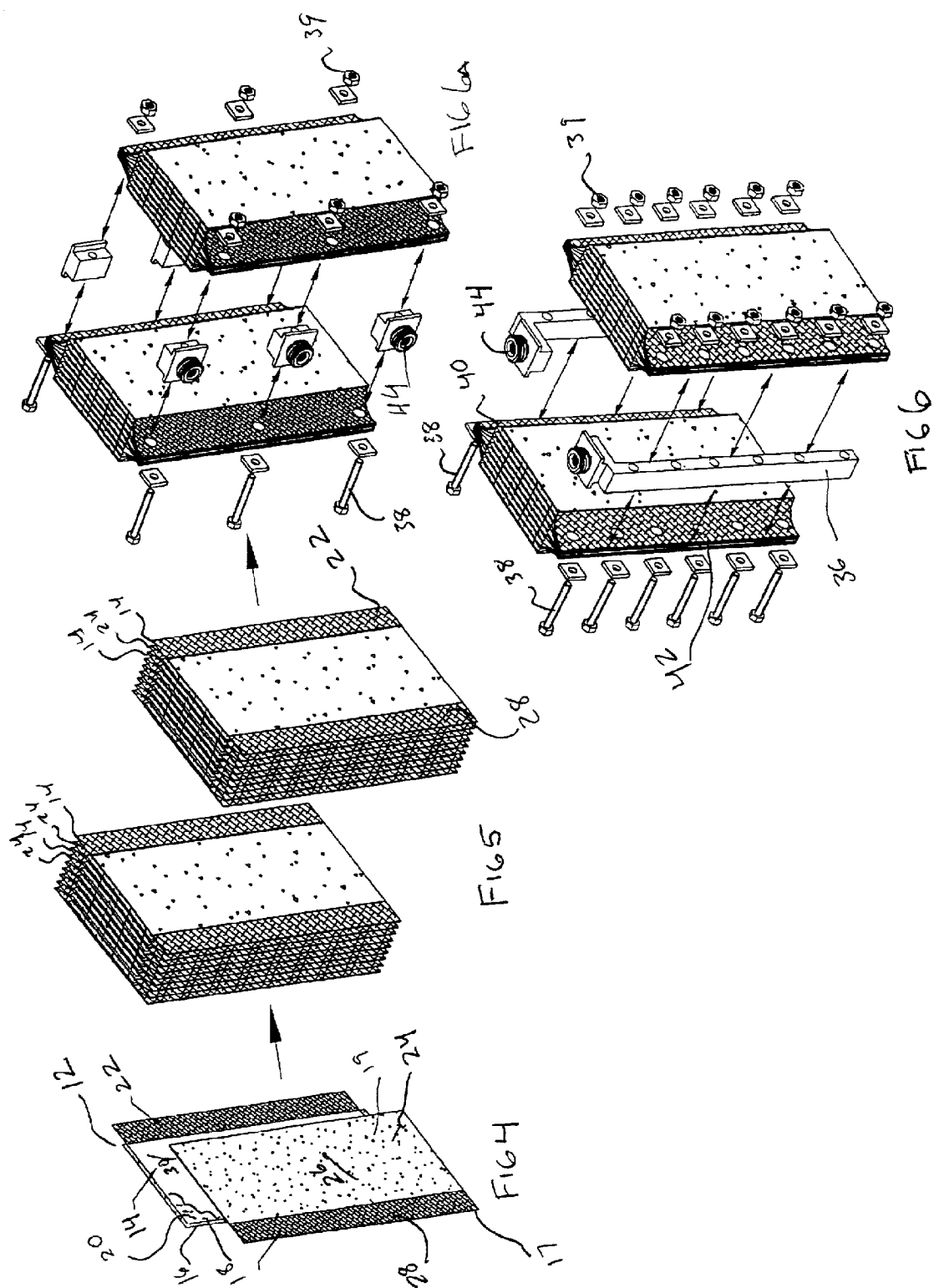

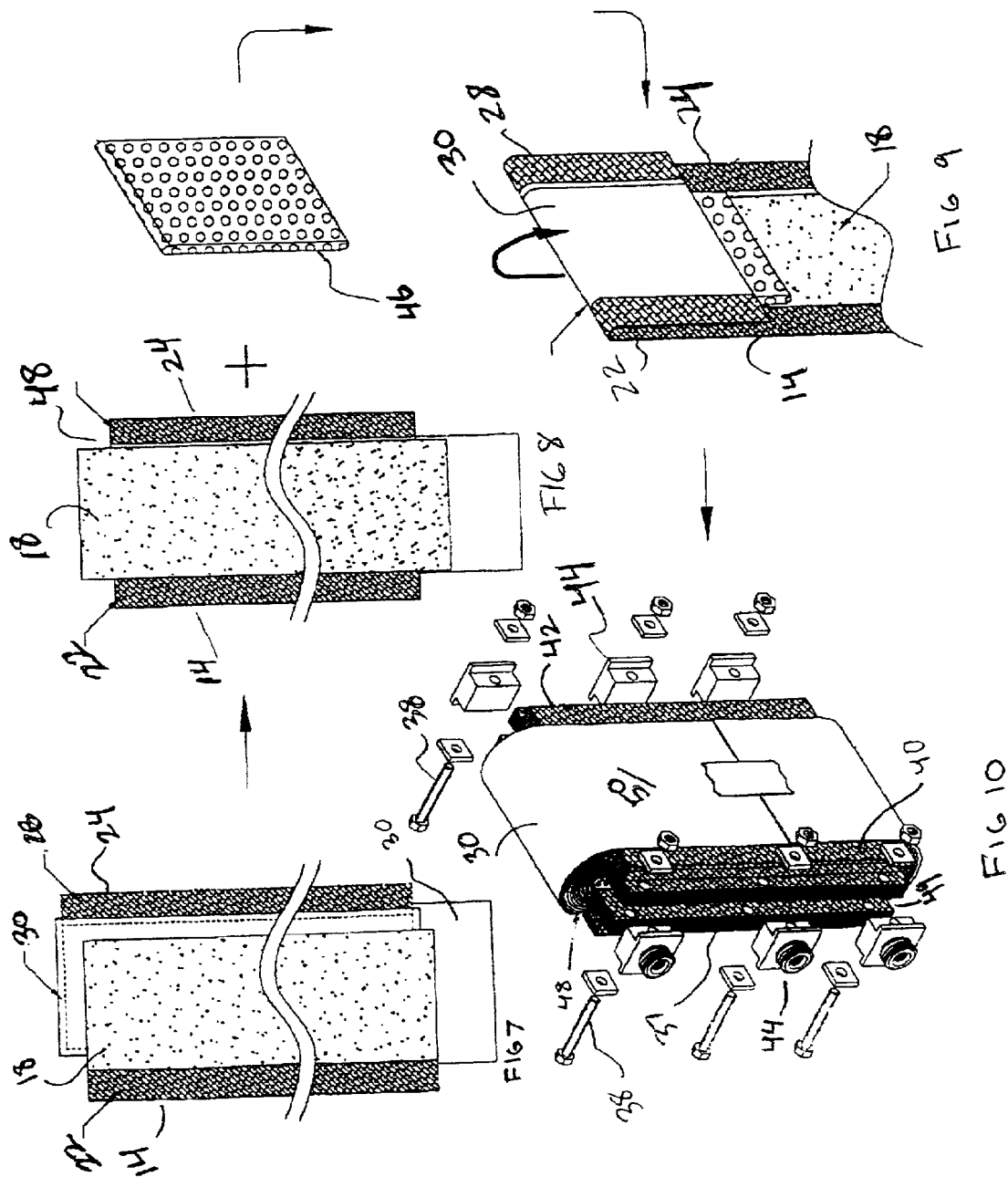

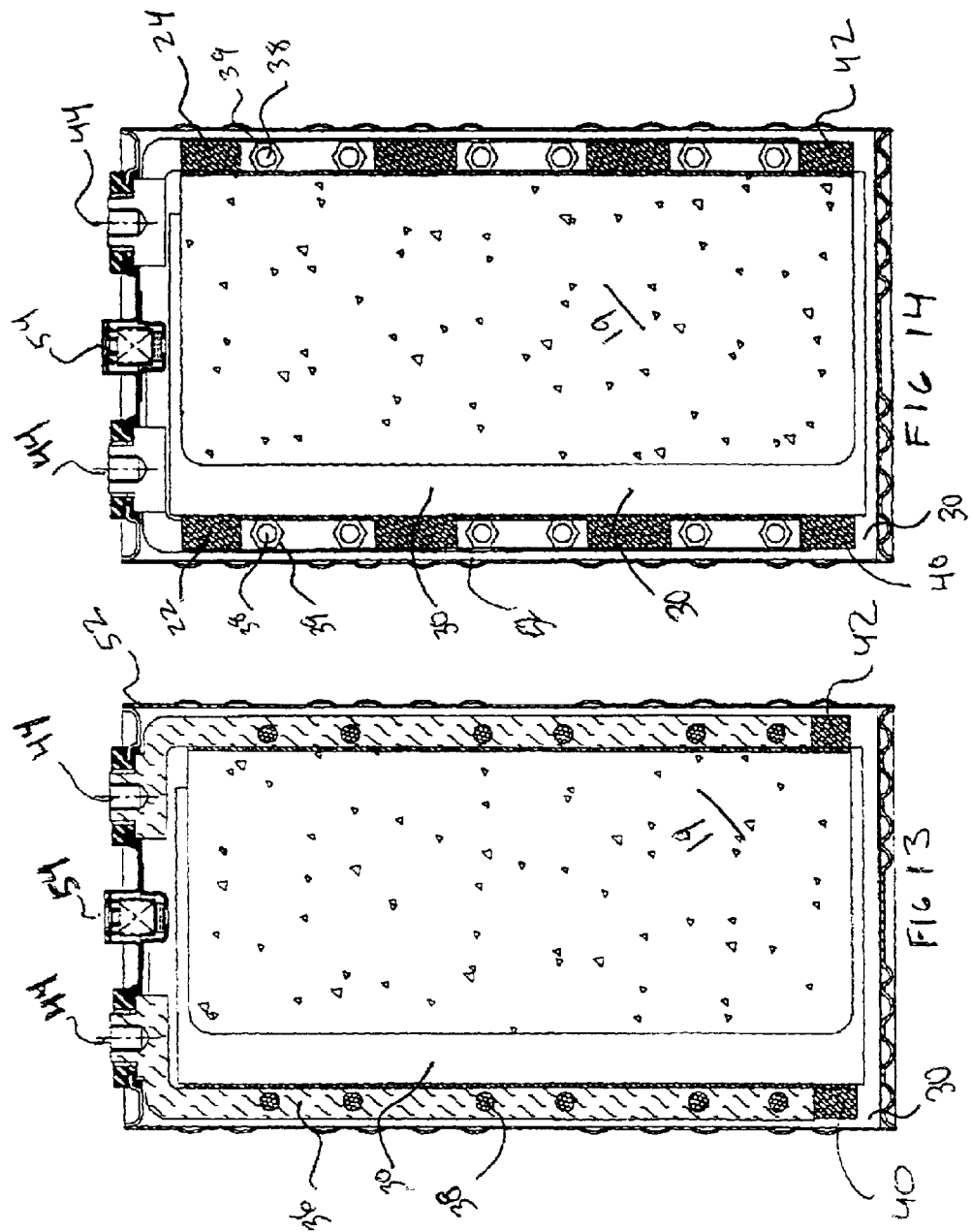

PRISMATIC BATTERY WITH MAXIMIZED AND BALANCED CURRENT TRANSMISSION BETWEEN ELECTRODES AND TERMINALS

This claims priority from provisional application Ser. No. 60/257,352, filed Dec. 22, 2000. More particularly it relates to a rechargeable battery having electrical communication between the electrodes and the terminals communicating power to and from the exterior of the battery, which maximizes the flow of electrical current therebetween.

FIELD OF THE INVENTION

Background of the Invention

Conventional electrochemical devices such as batteries are manufactured to provide electrical power to a wide variety of devices needing a reliable portable supply of electricity. Such battery devices provide the electrical power for everything from watches to automobiles and as a consequence great value is placed on the energy density or electrical storage capacity of these devices and their continued ability to provide an adequate supply of electrical current to the communicating electrical device.

For smaller batteries, the ease of manufacturing and the requirement of hermetic sealing in a pressurized battery container favor the use of a cylindrical design for the battery cell. In a typical cylindrical configuration, the positive and negative electrodes in the form of thin plates are mechanically wound into a jelly roll formation of thin plate electrodes having a separator or absorber sandwiched between the thin plate electrodes. One or more electrically conductive tabs connect to the electrodes and communicate power therefrom to a terminal which communicates with the exterior of the battery cell. Many times the case containing the battery will function as one of the terminals. Other batteries are formed of rectangular or cube shapes for inclusion in phones and electronic devices requiring batteries but lacking the space required for cylindrical designs or for large batteries for devices requiring large amounts of electrical current such as vehicles.

Rechargeable batteries are used in a wide variety of industrial and commercial applications to power vehicles, electronic equipment, and similar devices. Rechargeable batteries, however, present another problem that must be considered due to the requirement that electrical current flow out of the battery at sufficient levels to power the device to which it is attached. Sometimes this current flow requirement can be extreme as in the case of an accelerating vehicle. But once discharged, the rechargeable battery also has the requirement that electrical current be able to flow back into the battery to the electrodes at sufficient levels to charge the battery but not too fast to overwhelm internal connections from the terminal to the electrodes, overheat, or damage the battery.

Consequently the choice of battery cells providing a power supply to a given component can be a trade off or compromise of the various different aspects inherent to certain types of batteries. In rechargeable batteries, for example, to achieve higher energy output per unit of weight, more electrolytically active material would be required in relation to the amount of conductive material in that electrode. Conversely, if higher power output is desired, an increased amount of conductive electrode materials will be required.

As a general rule, thicker electrodes in a cylindrical style rechargeable battery provide higher energy capacity since the electrodes will be shorter than thinner electrodes for the same energy rating and thereby require a shorter length. Thicker electrodes yield less surface area per unit volume and hence, more active material is present. However, this could result in a reduced power performance of the battery as often there is a limit as to how thin electrodes can be made. Further, the diameter of cylindrical cells is often limited by thermal management considerations.

A popular alternative to such design concerns is provided by the prismatic battery designed for the right combination of power and energy flow characteristics for the job at hand. The conventional design of prismatic rechargeable batteries has positive and negative electrodes formed as discrete thin plates separated and positioned adjacent to each other alternately to form a battery stack. Conductive tabs are attached through welding or other means to a point at one edge of the plates forming the foundation for the positive and negative electrodes and communicate with a positive or negative terminal on the opposite end to provide the external connection for the battery.

In conventional battery designs the portions of the individual electrode which are closest to the two terminals will undergo the most electrolytic reaction and conversely, those furthest from the electrode only take part in such a reaction as the closest portions of the electrode approach exhaustion. Another problematic area of conventional battery design results from the fact that internal resistance of the battery will increase as soon as the electrolyte, disposed between the positive and negative terminals, begins to diminish in electrolytic reactivity. Still further, when using the aforementioned conventional tab and terminal communication from the electrodes, high current flow through the electrodes to the terminals during discharge and recharge can result in severe damage to the battery should the connection from the electrodes to the terminals be inadequate to handle the current flow.

As can be discerned, it is imperative that corrosion between the electrode and the terminal communications should be minimized. Further, it is imperative that the conducting path provided from the electrode to the terminal, in addition to braving high current requirements, should be substantially equalized in relation to the distance from the terminals to the electrodes to maximize the area of reaction on the individual electrodes thereby maximizing current flow and minimizing heat build up.

There is a pressing need as such, for a prismatic battery having components that remedy the aforementioned problems related to conventional designs. Such a prismatic battery should provide the maximum area of communication between both electrodes and the current collectors communicating electrical current from the electrodes to both terminals to both maximize current transfer in both directions and minimize heat. Such a prismatic configured battery should also provide for high capacity in the smallest physical area and for easy manufacture.

SUMMARY OF THE INVENTION

Conventionally manufactured prismatic cells generally feature a plurality of stacked electrodes encased in a battery case and communicating with external terminals. In conventional prismatic cells positive electrodes formed by placement of positive active material on a flat foundation substrate form the positive active surface area of the positive electrode. Negative electrodes are formed in the same fashion by the placement of negative active material on a planar foundation substrate thereby forming a negative active surface area of the negative electrode. The positive electrodes and negative electrodes are arranged inside the battery case in a stacked arrangement with separators of porous non-conductive materially positioned in between each positive and negative electrodes.

Electrical current generated by the positive active surface area and the negative active surface area of the respective electrodes is communicated by conductive tabs which are welded or otherwise affixed on the edge or corner of the substrates providing the foundation for the positive and negative electrode active areas. The tabs of all of the negative electrodes are electrically connected and communicate with the negative pole of the battery and the tabs connected to the positive electrodes are electrically connected to each other and the positive pole of the battery.

The conventional tabbed arrangement creates a need for the current to go across and down the electrodes. If the electrodes are made with tabs placed close together, it can collect some current from just the top of the electrodes with low resistance. This advantage is temporary because the top becomes discharged and the current must then travel across and through the center of the electrode and finally across and to the bottom of the electrodes. One can make the electrode width narrower but the reaction zone will narrow and longer force the current through a smaller and smaller zone and require the zone to move down a much longer electrode.

The improved arrangement is such that the distance traveled is the width W of the electrode stack. Now W can be reduced to near zero and so the resistance can be reduced to any desirable low value. All of the above requires that either and both the corner tabs or side collectors have a much lower resistance than the electrodes. Reducing the plate resistance by thickening the conductors on which they are connected will reduce the capacity of the cell unduly. Therefore, electrodes are relatively high in resistance when compared to the collecting corner tabs or side tabs. Additionally, the material of the side or corner collector must be unconventionally low to reach a very low total resistance required by a very high power device and makes the assumption true. The preferred design provides copper collectors protected by Nickel plating to provide a very low resistance. Conventional designs typically use resistive pure Nickel collectors to avoid the need for excellent, nonporous plating to protect the corrosion prone Copper. There is a loss of deliverable energy, caused by the higher resistance in the corner tab design. The energy loss must be rejected from the cell stack as heat. This heat generation can lead to very high temperature and failure of the cell stack.

Estimates, at constant current flow, were made to show the relative advantages of the preferred construction over the conventional construction. Typical resistance values for the corner and side tabs and the electrodes of the stack (i.e. the tabs being much lower in resistance than the electrodes).

In FIG. 2a the voltage distribution of the conventional design is shown. For this case the total voltage drop is 0.063 V.

In FIG. 2b, the current is shown to be only 6 percent of the current at the top stack. All this occurs to minimize the voltage drop.

In FIG. 3a, the voltage distribution of the preferred case is shown. The total voltage drop is 0.022 V.

In FIG. 3b, the current at the bottom of the plate is at least 68% of the current at the top.

Initially the voltage loss by the preferred design is about 36% of the conventional design. Not shown is that the advantage will increase as the battery is discharged. The conventional design will discharge completely at the top and the reaction distance and voltage drop will increase as the reaction zone moves towards the bottom of the plate.

The aforementioned problems related to conventional prismatic battery construction, and others, are overcome by the herein disclosed components, their configurations, and interconnection thereof, to yield an improved prismatic battery with maximized yet balanced current transmission between both electrodes and their communicating terminals.

The device and disclosed preferred embodiments herein feature a unique formation of the electrode assembly yielding flat, cubical, and other configurations of prismatic batteries. Central to the improved design is the use of an electrode assembly that maximizes the area contact and current communication from the edge of the electrodes to the terminals. In the disclosed embodiments, both electrodes contact one or a plurality of terminals and communicate current from their entire respective edge surfaces thereby providing a major advance in utility over the aforementioned conventional prismatic cells which use small welded tabs to provide such current communication. Not only is the resistance minimized by the disclosed design, the time consuming and expensive requirement of welding tabs to both the electrodes and the terminals as required by prior art has been eliminated.

In the rectangular embodiment, a plurality of planar generally rectangular sheets of electrically conducting substrate material are each coated with appropriate mixtures of active material which forms a positive or negative electrode on the coated surface of the substrate. Substrates intended as positive electrodes are coated with actives best suited for that terminal in the contemplated use. The same is done with the substrate sheets to be used as negative electrodes. One edge of each sheet of substrate forming each positive and each negative electrode is left uncoated along the entire edge.

Substrates forming positive electrodes are then stacked adjacent to substrates forming negative electrodes but separated by a rectangular sheet of separator fabric sandwiched between but separating only the area covered by the actives and the adjacent substrate and leaving all of the uncoated edges on each side edge in communication. All of the uncoated edges of the coated substrates forming the positive electrodes are placed on one side of the stack adjacent to each other and the uncoated negative edges are placed opposite the uncoated edges of the positive electrodes when the stack is complete.

As can be understood, each electrode assembly formed of this plurality of positive and negative electrodes and assembled in this fashion will communicate current from one entire edge which is adjacent to the active material.

To further maximize current flow to the terminals, all of the exposed uncoated electrode sides are then joined to a pair of conductors which attach to the stacks of positive and negative edges and secure the edges to each other and to the positive or negative terminal for current transmission to the exterior of the device. Consequently, current from each and every electrode is provided substantially an entire edge to communicate with the terminal maximizing flow and minimizing heat. Additionally, because the distance of the electrical conducting path for collection of electrons from every location on the positive and negative electrodes to their respective uncoated edge is substantially equidistant, the aforementioned electrolytic reaction is uniform along the entire surface area of each electrode thereby minimizing the adverse effects that result from uneven reactions.

Accordingly, it is the object of the invention claimed herein to provide an electrode assembly design that minimizes resistance to current flow to and from electrodes through the provision of maximum contact of each electrode with a terminal.

It is another object of this invention to provide a prismatic battery cell which will provide maximum current transfer without damage to the cell.

It is still another object of this invention to provide a prismatic cell which is constructed in a fashion to eliminate tab and wire welding for communication between electrodes and terminals.

It is a still further object of this invention to provide a prismatic battery which minimizes thermal problems caused by high current flow in short time periods.

An additional object of this invention is provision of a prismatic battery that may be easily connected to other prismatic batteries with one or a plurality of connections there between.

Further objectives of this invention will be brought out in the Following part of the specification, wherein detailed description is for the purpose of fully disclosing the invention without placing limitations thereon.

BRIEF DESCRIPTION OF THE DRAWING FIGURES

The accompanying drawings which are incorporated in and form a part of this specification illustrate preferred embodiments of the disclosed device and together with the description, serve to explain the principles of the invention.

Figure 2:
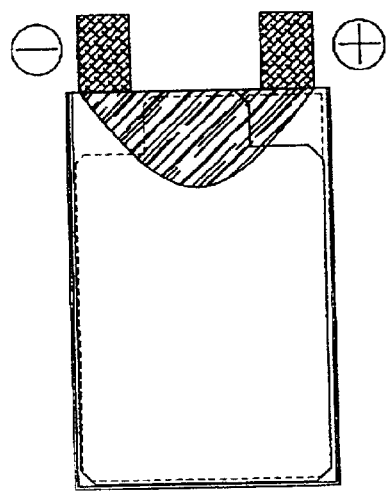
FIG. 2 is a side view of the prior art shown in FIG. 1 and depicting diminished current flow to the battery terminals.
Figure 2A:
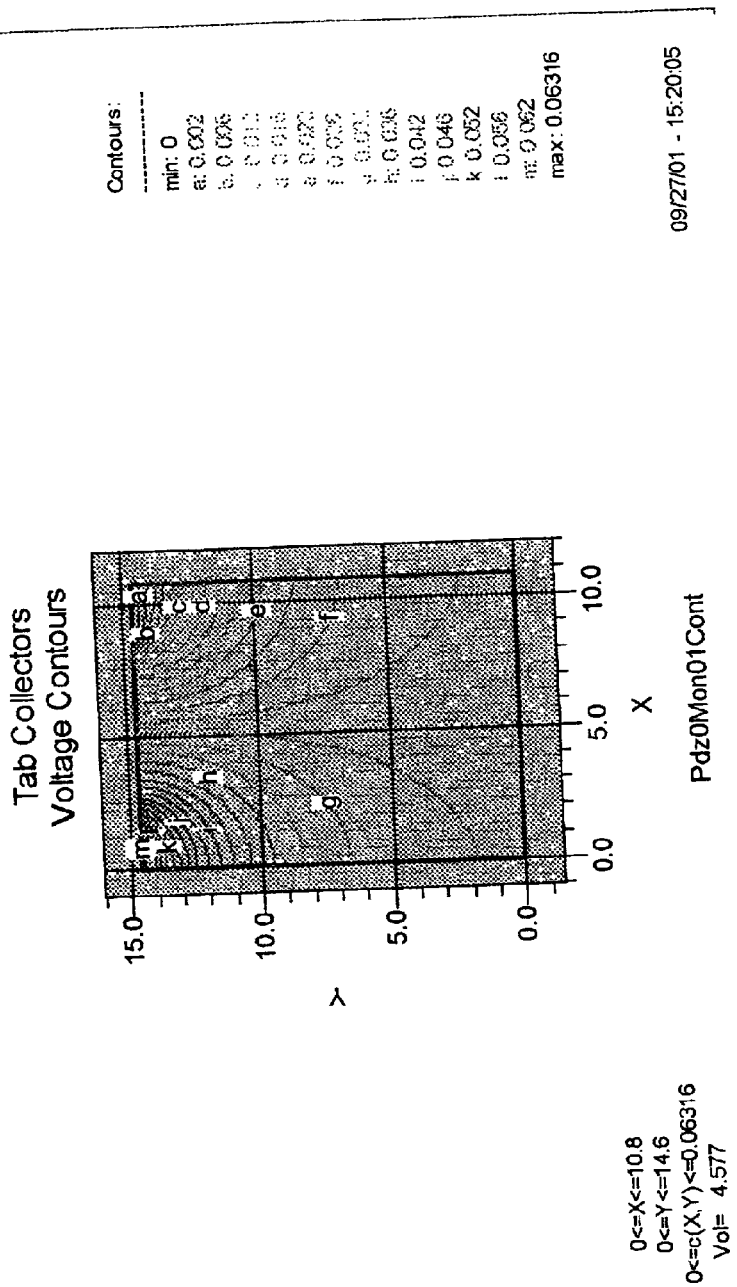
FIG. 2a depicts the overall higher voltage drop due to the welded tab design limiting the flow of electrical current from the electrodes.
Figure 2B:
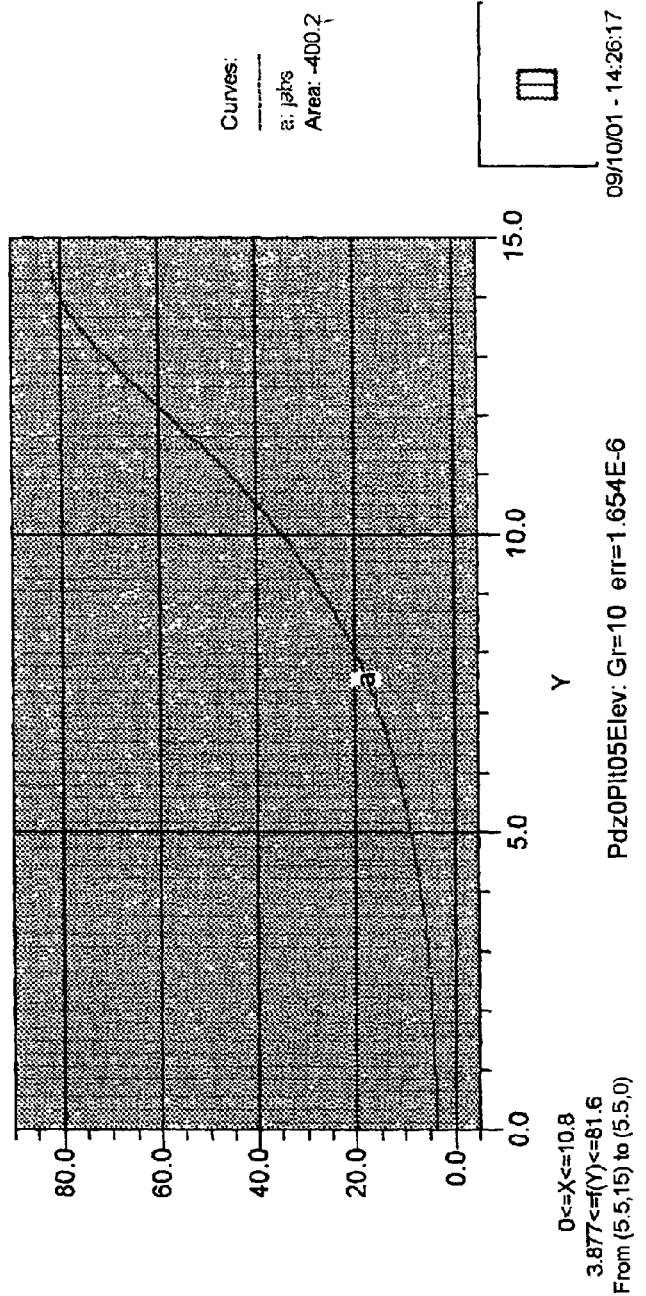

FIG. 2b graphically depicts that even a redistribution of current, that must occur, to the top of the stack still results in the high voltage loss.

Figure 3:
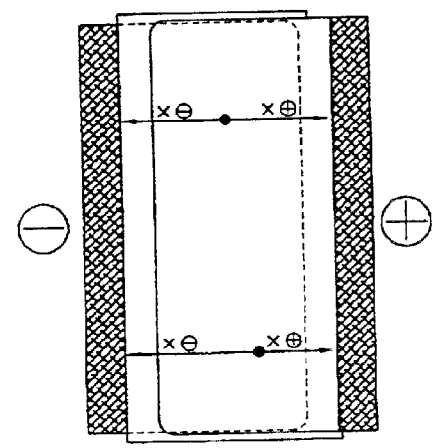

FIG. 3 depicts the disclosed device with a plurality of electrodes dimensioned in a rectangular planar fashion and adjacently stacked.

FIG. 3a depicts the lower total voltage loss provided by the disclosed device.

FIG. 3b shows that the current distribution of the disclosed device is much more even and will maintain its low voltage loss long in to the discharge.

FIG. 4 shows the device featuring a plurality of rectangular electrodes having uncoated edges on opposite sides for stacking together with separators between active coated areas and the adjacent sheet of conductive substrate.

FIG. 5 depicts a plurality of stacked electrodes.

FIG. 6 depicts an embodiment of the device with elongated rails mated to positive and negative conducting edges of the electrodes.

FIG. 6a depicts a different embodiment with a plurality of contacts attached to the positive and negative conducting edges of the plurality of stacks of electrodes.

FIGS. 7–10 depict the formation of a rolled embodiment of the device using multi layers attached to a plurality of terminals.

Figure 11:
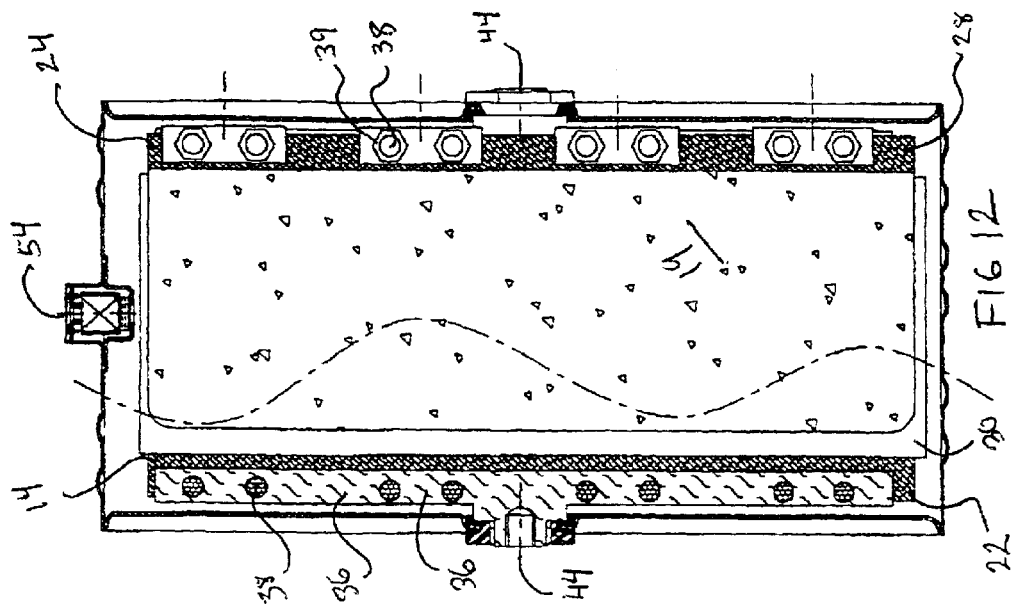

FIG. 11 shows a side cut away view of a preferred embodiment of the disclosed device encased with a plurality of electrical contacts on each side.

Figure 12:
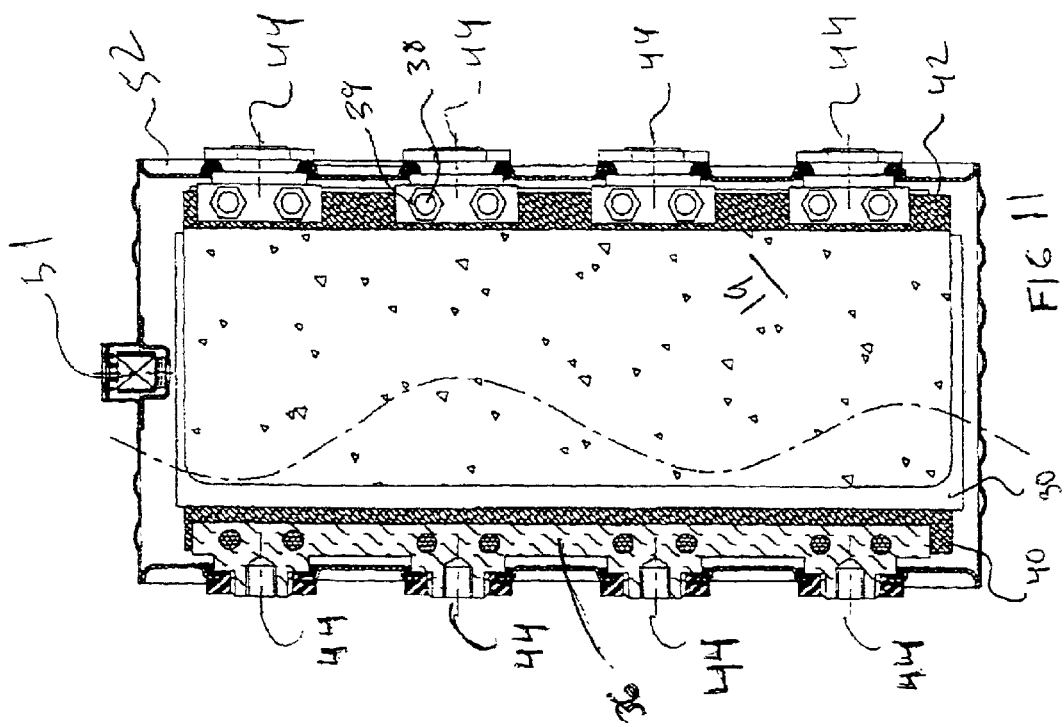

FIG. 12 illustrates an embodiment featuring a single contact on each side of the device communicating with an elongated conductor.

FIG. 13 shows a section view of an embodiment of the device featuring top mounted contacts communicating with elongated conductors extending down each of two sides.

FIG. 14 depicts an end view of FIG. 13.

Figure 15:
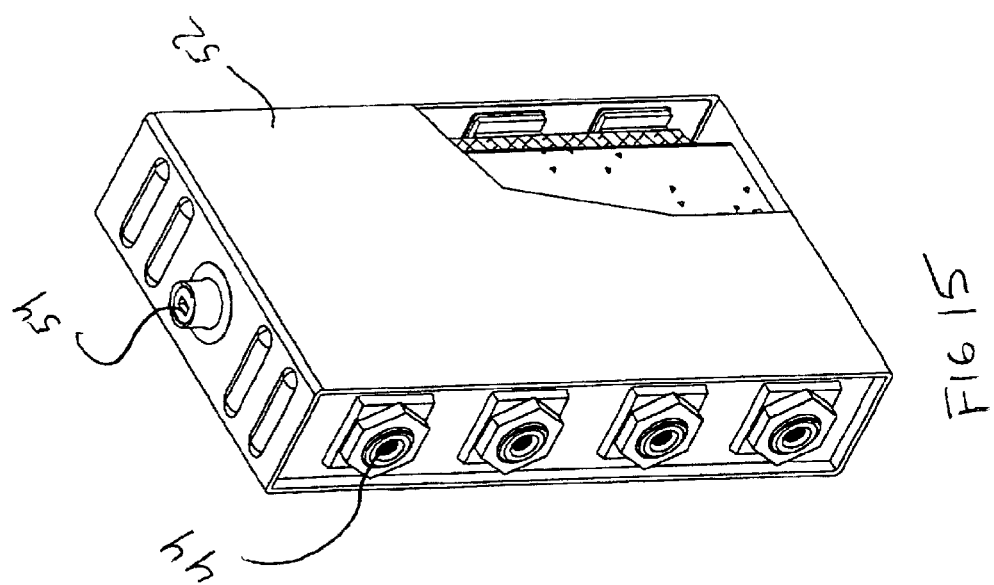

FIG. 15 depicts encased stacked electrodes having a plurality of side mounted contacts on each side for communicating electrical power to and from the electrodes.

Figure 16:
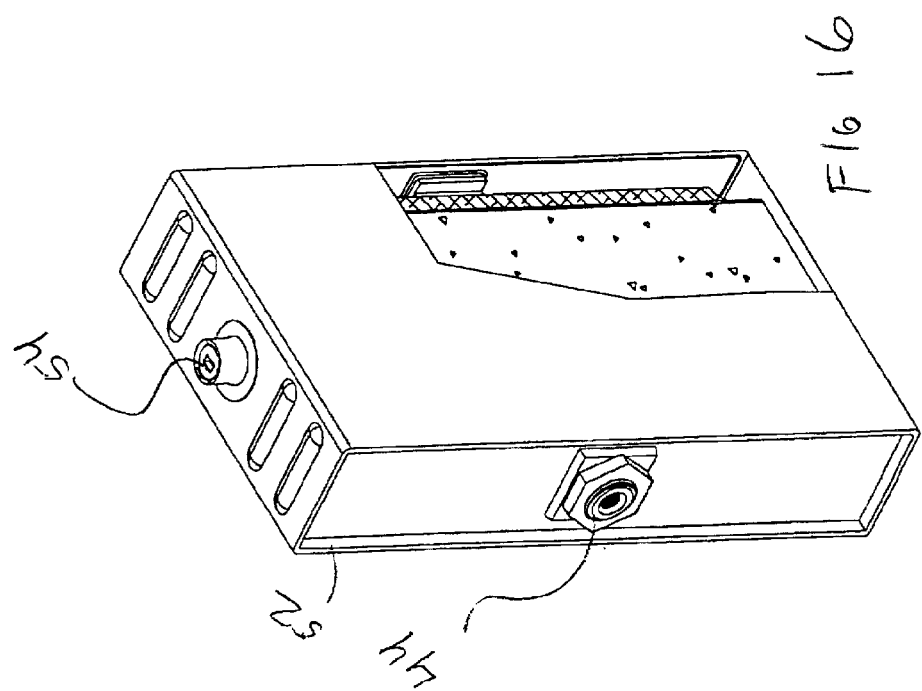

FIG. 16 shows an encased stacked electrode embodiment with single side mounted contacts for communicating electrical power to and from the electrodes.

DETAILED DESCRIPTION OF THE PREFERRED EMBODIMENTS OF THE DISCLOSED DEVICE

Figure 1:
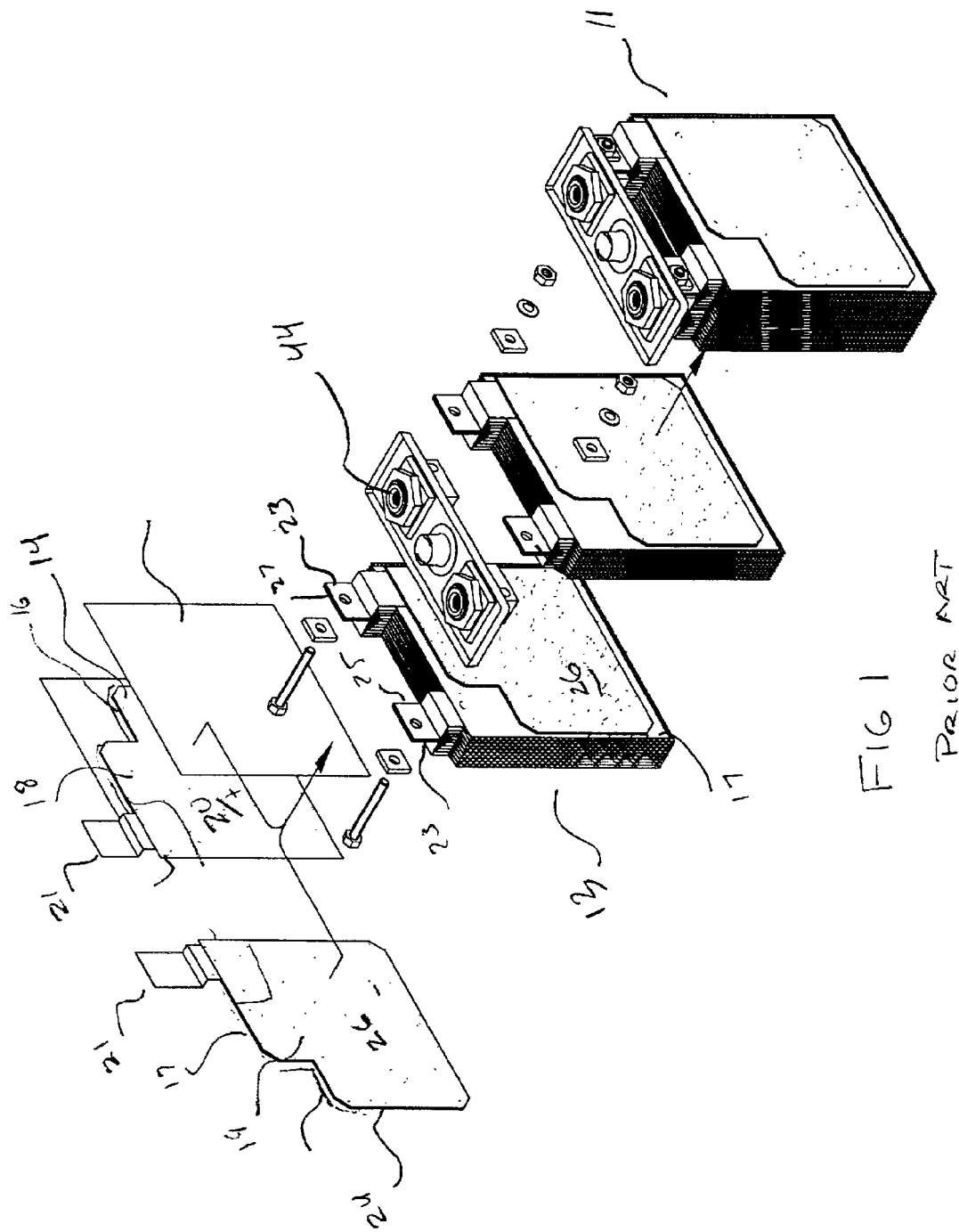
FIG. 1 is a prior art depiction depicting an exploded view of a conventional prismatic battery cell having tabs welded or otherwise attached to electrodes.

Referring now to FIGS. 1–2 which depict the prior art of conventionally manufactured prismatic cells. FIG. 1 depicts an exploded view showing a plurality of stacked electrodes 13 forming a conventionally configured prismatic battery cell 11. In conventional prismatic cells 11 positive electrodes 14 are formed by placement of positive active material 18 on a substrate 16 to form the positive active surface area 20.

Negative electrodes 24 are formed by the placement of negative active material 19 on substrate 17 thereby forming a negative active surface area 26. The positive electrodes 12 and negative electrodes 24 are placed in a stacked arrangement with separators 30 of non-conductive material sufficiently porous to allow passage of the chosen electrolyte therethrough, positioned in between each of the plurality of positive electrodes 14 and negative electrodes 24.

Transmission of the current or electrical from positive active surface area 20 and the negative active surface area 26 and the electrolyte communicating there between through the separator 30 is provided by tabs 21 which are welded at an edge or corner of the respective positive substrate 16 and negative substrate 17. The tabs 21 welded or otherwise attached to the positive substrates 16 of the stack form a positive terminal 25 in the case of a single positive electrode 14 or in the case of a plurality of positive electrodes 14 are then all attached to a connector 23 which acts as the positive terminal 25 of the cell 11. Tabs 21 are also welded or otherwise attached to the negative substrates 17 thereby forming the negative terminal 27 in cases where one negative electrode 24 is used and as is more common where a plurality of negative electrodes 24 are used, they are similarly joined and attached to a connector 23 and thereby form the negative terminal 27 of the cell. Communication of the connectors 23 with external contacts 44 will allow such contacts 44 to interface between the charging device or the cell powered device external to the cell 11 and with the positive terminal 25 and negative terminals 27.

An inherent flaw with this conventional design is the fact that the tabs 21 welded to a small area of the positive and negative substrates 16 and 17, create a longer and more resistive path than that of the preferred design. The need for this increased distance was previously described for the conventional design. Still further, the heat generated by forcing all of the current flow into and from the electrodes through this extra distance is increased greatly by the cell 11 during discharge and charging cycles.

A first-preferred embodiment of electrode configuration of the disclosed device 10 which overcomes the shortcomings of prior art is depicted in FIGS. 3–6. As depicted in FIG.

3, the disclosed device 10 features a plurality of electrodes in the form of at least one positive electrode 14 and one negative electrode 24 dimensioned in a rectangular planar fashion. It should be understood that the plurality of electrodes will generally have a plurality of positive electrodes 14 and a plurality of negative electrodes 24 forming the device 10 and the number of positive and negative electrodes in the plurality of electrodes in the device 10 need not be equal as depicted and in many cases an unequal number of positive electrodes 14 and negative electrodes 24 may be used.

In this and other embodiments of the device herein described, one or more stacks of electrodes are formed from a plurality of electrodes, with each stack formed from one or more positive electrodes 14 and one or more negative electrodes 24 which are dimensioned substantially rectangular in shape and are stacked adjacent to each other. Material forming the positive electrode 14 features a rectangular positive substrate 16 with a positive active surface area 20 formed thereon by electrolytically positive active material 18 adhered to one or both sides of the positive substrate 16 and thereby forms the positive active surface area 20 of the positive electrode 14. One entire edge surface of the substrate 16 is left uncoated by the electrolytically active material 18 thereby defining the positive conducting edge 22 and a positive current collector which is in electrical contact with substantially the entire edge of the positive active surface area 20. As depicted, the rectangular shape of both the positive electrode 14 and negative electrode 24 have a longer length dimension than width which is a preferred dimensioning scheme.

The material forming the rectangular substrate 17 for the negative electrode 24 is formed by a negative active surface area 26 formed thereon by electrolytically negative active material 19 suited to the negative electrode 24 which is adhered to one or both sides of the substrate 17 forming the negative electrode 24. Again, substantially the entire edge surface of the negative substrate 17 is left uncoated by the electrolytically active material 19 thereby defining the negative conductive edge 28 and negative current collector which is in electrical contact with substantially the entire edge of the negative active surface area 26.

As shown in FIG. 4, by allowing electrical communication between substantially the entire length of the positive conductive edge 22 and the positive active surface area 20, the resistance to current flow from the positive electrode 14 is minimized due to the close spacing of the positive and negative current collectors. The same is true of the negative electrode 24 which is configured in the same fashion. The elongated contact of substantially the entire positive conductive edge 22 with the positive active surface area 20 and substantially the entire negative conductive edge 28 with the negative active surface area 26 thus solves the problem noted in the prior art of the longer conduction path and limited current flow from the electrodes thereby caused. The overlap of the positive and negative electrodes of adjacent substantially equal dimensioned electrodes forms an area called the reaction plane. Reaction area on both electrodes is maximized since the sum of the distance between the positive conductive edge 22 forming the positive collector and the negative conducting edge 28 forming the negative collector, for every point in this reaction plane is essentially equal. The same configuration minimizes the heat generation of the device 10 due to the minimization of the conduction distance of the electrodes during discharge and charging of the device 10.

The plurality of electrodes formed as noted above in a generally rectangular fashion are positioned in a stacked relationship immediately adjacent to each other with separators 30 of non conductive material, sufficiently porous to pass the chosen electrolyte solution therethrough, positioned in-between each of the plurality of positive and negative electrodes 14 and 24 so stacked. In a current preferred mode of the rectangular embodiment, all of the positive conductive edges 22 are formed substantially equally dimensioned and when in the stacked arrangement are positioned immediately adjacent to each other offset from the negative active surface area 26 of any negative electrodes 24 in the plurality of electrodes so stacked. The same is true of the negative conductive edges 28 which are also best dimensioned substantially the same in size to maximize conducting surface area and are positioned on an opposite side edge of the stacked plurality of electrodes offset from the positive active surface area 20 of the positive electrode 14 members of the plurality of electrodes 12.

Once the plurality of electrodes formed by the positive electrodes 14 and negative electrodes 24 is in the stacked relationship with separators 30 between each member, the adjacent positive conductive edges 22 forming a positive edge portion 40 and adjacent negative conductive edges 28 forming a negative edge portion 42, positioned on each side of the device 10 are respectively joined into electrical contact with an elongated electrical conductor 36 using a means of attachment of the positive edge portion and negative edge portion to respective conductors 36. This joining is accomplished in the current best mode using electrical conductors 36 and cooperating fasteners 38 communicating through the positive edge portion 40 and negative edge portion 42 respectively. The conductors 36 on all embodiments herein described and any components used for their attachment are in the current best mode best made from a metal wherein the bulk resistivity is less than 10e-6 ohm-cm. For example, in the current best mode, Copper is 1.7e-6 ohm-cm is used and preferred. Furthermore the material forming the conductors 36 and attaching components is best made corrosion resistant or coated with a conductive corrosion resistant material and in the current best mode of the device the conductors are plated with Nickel for this purpose. As noted above, joining of the conductors 36 to the edge portions is accomplished in the current best mode using fasteners 38 communicating through the positive edge portion 40 and negative edge portion 42 respectively. However the welded fasteners or crimping of clips or other means of attachment might be used in some instances and such are anticipated. The distal end of the cooperating fastener is secured by a cooperatively engaging end fastener 39 which in the depicted mode would be a nut threaded internally to engage similar threads on the distal end of the cooperating fasteners 38 and which then may be compressibly engaged upon the cooperating fasteners 38 to compress the positive edge portions 40 and negative edge portions 42 with the electrical conductors 36 thereby achieving an excellent electrically conductive engagement.

In a preferred mode an electrical conductor 36 is dimensioned to form a communicating attachment at substantially the entire length of the positive edge portion 40 as is the electrical conductor 36 in its connection with the negative edge portion 42. By taking advantage of this connection configuration, the communication of electrical current from and to the positive active surface area 20 and from and to the negative active surface area 26 from the positive edge portion 40 and negative edge portion 42 respectively, is maximized as well as equalized, thereby yielding the aforementioned benefits of thermal reduction and maximized current flow. Consequently the ability of the plurality of electrodes forming positive and negative electrodes 14 and 24 of the device 10 to provide high current flow during periods of peak current draw, as well as to allow for fast charging from high reverse current flows of the charging device, are greatly enhanced.

As depicted in FIG. 6, the electrical conductors 36 provide attached electrically communicating contacts 44 whereby electrical power to and from the assembled plurality of electrodes of the device 10 may be communicated to wires or similar conventional means of electrical communication. In FIG. 6, one contact 44 on each conductor 36 is shown; however it is anticipated that in high current use and charging environments such as powering automobiles, a plurality of contacts 44 can also be provided upon each conductor 36 to allow multiple connection points to communicate power into and out of the device 10. Multiple connection points with multiple contacts 44 would be especially helpful when a plurality of batteries is assembled to power a large device such as a car and the batteries need to be electrically attached to each other in series or parallel to reach the desired voltage and current flows to power the vehicle. Such an arrangement of batteries could easily be connected by wires between the multiple connection points provided. Of course the contacts 44 could take on a variety of conventional shapes and forms to accommodate the wire or connector mating to or cooperatively engaging with the contact 44 and such is anticipated.

Another preferred embodiment of the device is depicted in FIGS. 7–10 showing the method and construction forming this embodiment which features the plurality of electrodes dimensioned in a generally rectangular fashion in FIG. 7 with the length of the plurality of electrodes being substantially elongated in relation to their width. This embodiment would use the same stacked configuration of at least one positive and negative electrode 14 and 24 forming the plurality of electrodes with a reactive area in the overlap, and would have separators between each member of the plurality of electrodes forming the stack. However, rather than having many individual electrodes lined up to form the stack, this embodiment forms the stack by forming a plurality of elongated electrodes in a wound layered engagement with a separator 30 therebetween and wound on a mandrel 46. The same offset of the positive conductive edge 22 from the negative active surface area 26 and the negative conductive edge 28 from the positive active surface area 20 would be best used.

Once wound around the mandrel 46, the stack would form the same positive edge portion 40 from all the adjacent similarly dimensioned positive conductive edges 22 and the same negative edge portion 42 from all of the adjacent similarly dimensioned negative conductive edges 28. Optional notches 48 can be cut into the corners of the members of the plurality of electrodes at the top and bottom of the positive conductive edge 22 and negative conductive edge 28 to form a more even and defined positive edge portion 40 and negative edge portion 42 when wound on the mandrel 46 and secured thereon. The separator 30 in this embodiment when wound can also function as the exterior insulator 50 of the formed device 10 by placement of an extra strip of the separator 30 upon the outside of the wound plurality of electrodes around the mandrel 46.

The wound embodiment as depicted in FIGS. 7–10, could use the elongated electrical conductors 36 substantially equal in length to the formed positive edge portion 40 and negative edge portion 42, or as depicted, one or a plurality of contacts 44 which are positioned in a gap 49 formed between a pair of positive edge portions 40 and also a pair of negative edge portions 42. The gap dimension is defined by the thickness of the mandrel 46 and is a natural result of the winding process. In this embodiment, the positive edge portions 40 would be attached using the cooperative fasteners 38 communicating through the positive edge portions 40 and negative edge portions 42 with the contacts 44 which are positioned in the gap 49.

FIG. 11 shows a side cut away view of a preferred embodiment of the disclosed device 10 encased with a plurality of electrical contacts 44 communicating through the case 52 on each side edge attached electrically to conductor 36 using cooperating fastener 38 and end fastener 39 to provide a means for pressured engagement of the positive conducting edge 22 and negative conducting edge 28 to the conductor 36 for the best possible connection. The plurality of electrodes inside the case 52 could, of course, be of a single stack arrangement, a plurality of stacks, or the embodiment rolled around a mandrel 46.

FIG. 12 illustrates an embodiment featuring a single contact 44 on each side of the device, each communicating with an elongated conductor 36 which is in the aforementioned pressured cooperative engagement with the positive conducting edge 22 and negative conducting edge 28 respectively. The choice of configuration of the plurality of electrodes in the case 52 could of course be one stack, a plurality of stacks or rolled on the mandrel 46 as the case may be.

FIGS. 13 and 14 show an embodiment of the device featuring top mounted contacts 44 communicating with elongated conductors 36 extending down each of two sides. One or more stacks formed of pluralities of electrodes are attached to and communicate with the conductors 36 on both the positive edge portions 40 and negative edge portion 42. The stacked electrodes are encased in a case 52 and a filler passage 54 is provided to add an electrolyte to the interior of the case 52. As mentioned earlier the choice of configuration of the plurality of electrodes in the case 52 may be one or a plurality of stacks of electrodes or rolled on a mandrel 46.

FIG. 15 depicts encased stacked electrodes of FIG. 11 which have a plurality of side mounted contacts 44 of positive polarity which communicate through the case 52 with the plurality of electrodes stacked and placed in the case in the aforementioned manner. A second plurality of side mounted contacts 44 of negative polarity would be positioned on the opposite side edge of the case 52 to provide electrical communication with the negative electrodes in the same manner.

FIG. 16 shows an encased stacked electrode embodiment of FIG. 12 with single side mounted contacts 44 for communicating electrical power to and from the positive and negative electrodes.

It should be understood that while the best embodiments of the device herein disclosed employ all of the group of individual improvements for the configuration, formation and locating of planar electrodes in a prismatic battery. However, greatly improved performance and utility might also be achieved, using one or more of the individual improvements herein disclosed and such is anticipated. Further, while the present device and method have been described herein, with reference to particular embodiments and components thereof, a latitude of modifications, various changes and substitutions are intended in the foregoing disclosure, and it will be apparent that in some instances some features of the device can and will be employed to improve existing batteries without a corresponding use of other features without departing from the scope of the device and method herein set forth. Consequently, all such modifications and variations are included within the scope of the invention as defined by the following claims.

What is claimed is:

1. An improved electrode assembly for use inside a battery having case with electrolyte therein, comprising:
   a plurality of electrodes arranged in a stacked relationship;
   said plurality of electrodes including at least two positive electrodes, each said positive electrode having a positive active surface area communicating with a positive conducting edge portion;
   said plurality of electrodes including at least two negative electrodes, each said negative electrode having a negative active surface area communicating with a negative conducting edge portion;
   each said positive conducting edge portion forming a positive current collector along substantially one entire edge of said positive electrodes;
   each said negative conducting edge portion forming a negative current collector along substantially one entire edge of each of said negative electrodes;
   said positive current collectors, of each of said positive electrodes, stacked adjacent to each other and in substantial contact with each other along their respective entire lengths, thereby forming a positive edge portion;
   said negative current collectors, of each of said negative electrodes stacked adjacent to each other and in substantial contact with each other along their respective entire lengths, thereby forming a negative edge portion;
   a porous separator disposed between said positive active surface area of each of said positive electrodes and said negative active surface area of each of said negative electrodes;
   a first elongated conductor in contact with substantially the entire length of said positive edge portion;
   means for attachment of said first elongated conductor to said positive edge portion;
   a second elongated conductor in contact with substantially the entire length of said negative edge portion;
   means for attachment of said second elongated conductor to negative edge portion; and
   said first elongated conductor and said second elongated conductor adapted at their respective distal ends, exterior to said battery, for communication of electrical power to an electrical device.

2. The improved electrode assembly as defined in claim 1 wherein said positive surface and said negative surface overlap, said overlap defining a reaction plane; and
   the sum of the distance to said positive conducting edge portions and the distance to said negative conducting edge portions, from any point on said reaction plane is substantially equal.

3. The improved electrode assembly as defined in claim 1 wherein each electrode in said plurality of electrodes is formed of electrically conductive substrate having electrolytically active material located on said electrically conductive substrate;
   the area of said electrolytically active material located on said electrically conductive substrate forming said positive electrode defining said positive active surface area;
   said positive conducting edge portions of said positive electrodes being the area of said electrically conductive substrate adjacent to said positive active surface area; and
   the area of said electrolytically active material located on said electrically conductive substrate forming said negative electrode defining said negative active surface area; and
   said negative conducting edge portions being the area of said electrically conductive substrate forming said negative electrode adjacent to said negative active surface area.

4. The improved electrode assembly as defined in claim 1 wherein
   said positive end portions being located on an opposite side of said electrode assembly from said negative edge portions.

5. The improved electrode assembly as defined in claim 1 wherein said plurality of electrodes are stacked with said positive active surface area of said positive electrode offset from said negative conducting edge portion of said negative electrode and said negative active surface area of said negative electrode are offset from said positive conductive edge portion of said positive electrode.

6. The improved electrode assembly as defined in claim 5 wherein said positive active surface area of said at least two positive electrodes is smaller than the dimensions of said negative active surface area of said at least two negative electrodes.

7. The improved electrode assembly as defined in claim 1 wherein said positive conducting edge portions and said negative conducting edge portions are positioned on adjacent sides of said electrode assembly formed by said plurality of electrodes arranged in said stacked relationship.

8. The improved electrode assembly as defined in claim 1 wherein said first elongated conductor coupled to said positive edge portion of said positive electrodes and said second elongated conductor coupled to said negative edge portions of said negative electrodes respectively secure said plurality of electrodes in said stacked relationship.

9. The improved electrode assembly as defined in claim 1 wherein said first elongated conductor and said second elongated conductor are adapted at their respective distal ends, exterior to said battery, for communication of electrical power to an electrical device,
   exterior to said battery through each of said first elongated conductor and second elongated conductor communicating with a respective terminal on the exterior of the battery.

10. The improved electrode assembly as defined in claim 1 wherein said first elongated conductor and said second elongated conductor have a bulk resistivity less than 10 e-6 ohm-cm.

11. The improved electrode assembly as defined in claim 1 wherein said first elongated conductor and said second elongated conductor are copper.

12. The improved electrode assembly as defined in claim 9 wherein said first elongated conductor and said second elongated conductor are copper.

13. The improved electrode assembly as defined in claim 11 wherein said first elongated conductor and said second elongated conductor are nickel plated.

14. The improved electrode assembly as defined in claim 12 wherein said first elongated conductor and said second elongated conductor are nickel plated.

15. The improved electrode assembly as defined in claim 1 additionally comprising means for pressured engagement of the positive conducting edge portions to each other and to said first elongated conductor extending substantially the entire length of said positive edge portion; and
   means for pressured engagement of said negative conducting edge portions to each other and to said second elongated conductor extending substantially the entire length of said negative edge portion.

16. The improved electrode assembly as defined in claim 9 additionally comprising means for pressured engagement of the positive edge portion to said first elongated conductor extending substantially the entire length of said positive edge portion; and means for pressured engagement of said negative edge portion to said second elongated conductor extending substantially the entire length of said negative edge portion.

17. An improved electrode assembly for use in battery comprising:

a plurality of electrodes arranged in a stacked relationship;

said plurality of electrodes including at least two positive electrodes, each said positive electrodes having a positive active surface area communicating with a positive conducting edge portion;

said plurality of electrodes including at least two negative electrodes, each said negative electrodes having a negative active surface area communicating with a negative conducting edge portion;

each said positive conducting edge portions in contact with adjacent positive conducting edge portions along substantially their entire respective conducting edge portions thereby forming a positive current collector along substantially one entire edge of said positive electrodes when in said stacked relationship;

each said negative conducting edge portions in contact with adjacent negative conducting edge portions alone substantially their entire respective conducting edge portions thereby forming a negative current collector along substantially one entire edge of each of said negative electrodes when in said stacked relationship;

a porous separator in a rolled engagement disposed between said positive active surface area of each of said positive electrodes and said negative active surface area of each of said negative electrodes;

a first elongated conductor in contact with substantially the entire length of said positive current collector formed by said positive conducting edge portions of said positive electrodes;

means for attachment of said first elongated conductor to said positive current collector;

a second elongated conductor in contact with substantially the entire length of said negative current collector formed by said negative conducting edge portions of said negative electrodes;

means for attachment of said second elongated conductor to said negative current collector; and means to communicate electric current to terminals exterior to said battery from said first elongated conductor and said second elongated conductor respectively.

18. An improved electrode assembly for use in battery of claim 17 wherein said plurality of electrodes are arranged in said stacked relationship and said porous separator in said rolled engagement, around a mandrel.

19. The improved electrode assembly as defined in claim 17 wherein the sum of the distance to said positive conducting edge and the distance to said negative conducting edge, from any point on said positive surface area is substantially equal; and the sum of the distance to said positive conducting edge and said negative conducting edge, from any point on said negative surface area is substantially equal.

20. The improved electrode assembly as defined in claim 18 wherein the sum of the distance to said positive conducting edge and the distance to said negative conducting edge, from any point on said positive surface area is substantially equal; and the sum of the distance to said positive conducting edge and said negative conducting edge, from any point on said negative surface area is substantially equal.

21. The improved electrode assembly as defined in claim 17 wherein said conductors have a bulk resistivity less than 10 e-6 ohm-cm.

22. The improved electrode assembly as defined in claim 21 wherein said conductors are copper.

23. The improved electrode assembly as defined in claim 21 wherein said conductors are nickel plated.

24. The improved electrode assembly as defined in claim 17 wherein said first elongated electrical conductor and said second elongated electrical conductor each have a plurality of said terminals, each of said plurality of terminals respectively communicating from a point exterior to said case on one end with said first and second elongated conductors at opposite ends.

25. The improved electrode assembly described in claim 1 wherein the resistance generated from the distance between the positive and negative current collectors can be reduced to satisfy any desired low level of required resistance of the electrode stack.

26. The improved electrode assembly described in claim 9, wherein each of said first elongated conductor and second elongated conductors each communicate with a plurality of respective terminals on the exterior of the battery at different points along their respective lengths.

* * * * *